(12) United States Patent
Gagnon

(10) Patent No.: US 6,648,018 B2
(45) Date of Patent: Nov. 18, 2003

(54) BYPASS CONTROL VALVE

(75) Inventor: Frederic Gagnon, Chatham (CA)

(73) Assignee: Siemens Automotive Inc., Ontario (CA)

( * ) Notice: Subject to any disclaimer, the term of this patent is extended or adjusted under 35 U.S.C. 154(b) by 37 days.

(21) Appl. No.: 09/888,574

(22) Filed: Jun. 26, 2001

(65) Prior Publication Data

US 2002/0033194 A1 Mar. 21, 2002

Related U.S. Application Data

(60) Provisional application No. 60/214,667, filed on Jun. 27, 2000, provisional application No. 60/214,633, filed on Jun. 28, 2000, and provisional application No. 60/244,227, filed on Oct. 30, 2000.

(51) Int. Cl.[7] .............................................. F16K 11/072
(52) U.S. Cl. ....................... 137/875; 251/152
(58) Field of Search ........................... 137/875, 625.44; 251/145, 148, 152

(56) References Cited

U.S. PATENT DOCUMENTS

| | | | | |
|---|---|---|---|---|
| 260,490 A | * | 7/1882 | Martin et al. ................. | 137/875 |
| 825,694 A | * | 7/1906 | Barbaroux ............. | 137/625.44 |
| 1,065,391 A | * | 6/1913 | Piel ........................ | 137/625.44 |
| 1,648,486 A | * | 11/1927 | Larsen ....................... | 137/875 |
| 2,035,747 A | * | 3/1936 | Harris .................... | 137/625.44 |
| 3,227,175 A | * | 1/1966 | Remington ............ | 137/625.44 |
| 3,521,659 A | * | 7/1970 | Seger ..................... | 137/625.44 |
| 4,232,517 A | | 11/1980 | Sumiyoshi et al. | |
| 4,338,731 A | * | 7/1982 | Shames et al. ................. | 34/82 |
| 4,351,361 A | * | 9/1982 | Worley .................... | 137/625.44 |
| 4,406,322 A | | 9/1983 | Rossi et al. | |
| 4,498,528 A | * | 2/1985 | Jacquet ......................... | 165/42 |
| 4,718,457 A | * | 1/1988 | Luger .......................... | 137/875 |
| 4,765,370 A | * | 8/1988 | Ariizumi et al. ........ | 137/625.65 |
| 4,821,771 A | * | 4/1989 | Maxwell ................ | 137/625.44 |
| 4,874,010 A | * | 10/1989 | DeJong et al. ............ | 137/484.4 |
| 4,936,289 A | | 6/1990 | Peterson | |
| 5,904,292 A | | 5/1999 | McIntosh | |
| 6,009,934 A | | 1/2000 | Sunaga et al. | |
| 6,098,957 A | * | 8/2000 | Vepy ..................... | 251/129.12 |
| 6,109,027 A | | 8/2000 | Schaefer | |
| 6,158,520 A | | 12/2000 | Reilly et al. | |

* cited by examiner

Primary Examiner—John Fox

(57) ABSTRACT

A bypass control valve including a wall that defines a first passage disposed along a first axis and having a first portion, a second portion, and a transitional portion disposed between the first and second portion. The transitional portion has a first port, a pivot point, and an annular locking member proximate the transitional portion, with the first port having a sealing surface disposed thereon. The bypass control valve also includes a first bypass passage disposed along a second axis oblique to the first axis. The first bypass passage has a second port, which projects into the transitional portion and which has a sealing surface and a receiver portion. The receiver portion is coupled to the locking members. The bypass control valve further includes a closure member having a first planar surface and a second planar surface with at least one elastomeric member disposed on each of the first planar surface and the second planar surface. The closure member is preferably pivotally attached to the pivot point and movable between a first position, with the first planar surface contiguous to the first port to permit fluid communication between the first portion and the first bypass passage and to prevent fluid communication between the first portion and the second portion, and a second position, with the second planar surface contiguous to the second port to permit fluid communication between the first portion and the second portion and to prevent fluid communication between the first portion and the first bypass passage. The bypass control valve also includes an actuator, which is operable to rotate the closure member between the first position and the second position. The actuator has a shaft coupled to the closure member and extending through the wall to the pivot point along a third axis orthogonal to the first and second axis.

20 Claims, 4 Drawing Sheets

BYPASS CONTROL VALVE

This application claims the benefits of provisional applications S.N. 60/214,667, filed on Jun. 27, 2000, S.N. 60/214,633, filed on Jun. 28, 2000, and S.N. 60/244,227, filed on Oct. 30, 2000, which are hereby incorporated by reference in their entirety.

BACKGROUND OF THE INVENTION

It is believed that a fuel cell consists of two electrodes sandwiched around an electrolyte. It is believed that oxygen, from air, passes over one electrode and hydrogen, from storage device, passes over the other electrode, that, in a chemical reaction, generates electricity, water and heat.

This invention relates to a bypass control valve for a fuel cell in general, and more particularly to a bypass control valve containing a main flow passage having a valve member, controlled by a non-contact position sensor, that diverts flow to a bypass passage.

SUMMARY OF THE INVENTION

The present invention provides for a bypass flow control valve that controls a flow of air or any other type of gas for a fuel cell. The bypass control valve includes a wall that defines a first passage disposed along a first axis. The first passage has a first portion, a second portion, and a transitional portion disposed between the first and second portion. The transitional portion has a first port, a pivot point, and an annular locking member proximate the transitional portion, with the first port having a sealing surface disposed thereon. The bypass control valve also includes a first bypass passage disposed along a second axis oblique to the first axis. The first bypass passage has a second port, which projects into the transitional portion and which has a sealing surface and a receiver portion. The receiver portion is coupled to the locking members. The bypass control valve further includes a closure member having a first planar surface and a second planar surface with at least one elastomeric member disposed on each of the first planar surface and the second planar surface. The closure member is preferably pivotally attached to the pivot point and movable between a first position, with the first planar surface contiguous to the first port to permit fluid communication between the first portion and the first bypass passage and to prevent fluid communication between the first portion and the second portion, and a second position, with the second planar surface contiguous to the second port to permit fluid communication between the first portion and the second portion and to prevent fluid communication between the first portion and the first bypass passage. The bypass control valve also includes an actuator, which is operable to rotate the closure member between the first position and the second position. The actuator has a shaft coupled to the closure member and extending through the wall to the pivot point along a third axis orthogonal to the first and second axis.

There is also provided a method of controlling bypass flow of air or any type of gaseous medium in a first passage to a second passage oblique to the first passage. In a preferred embodiment, the first passage has a closure member pivotally attached to a boss portion of the first passage. The method can be achieved by positioning the closure member in two positions to control the flow path. In the preferred embodiment, the method can be achieved by providing a first flow path between a first portion, a transition portion, and a second portion of the first passage; providing a second flow path between the first portion and a first bypass port of the second passage that extends into the transition portion of the first passage; positioning the closure member in the first portion that provides a fluid-tight seal between the first passage and the first bypass port to occlude flow through the second passage, thereby allowing flow through the first flow path; and positioning the closure member in the transition portion that provides a fluid-tight seal between the first passage and the second portion to occlude flow through the second portion, thereby allowing flow through the second flow path.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENT

Figure 1:
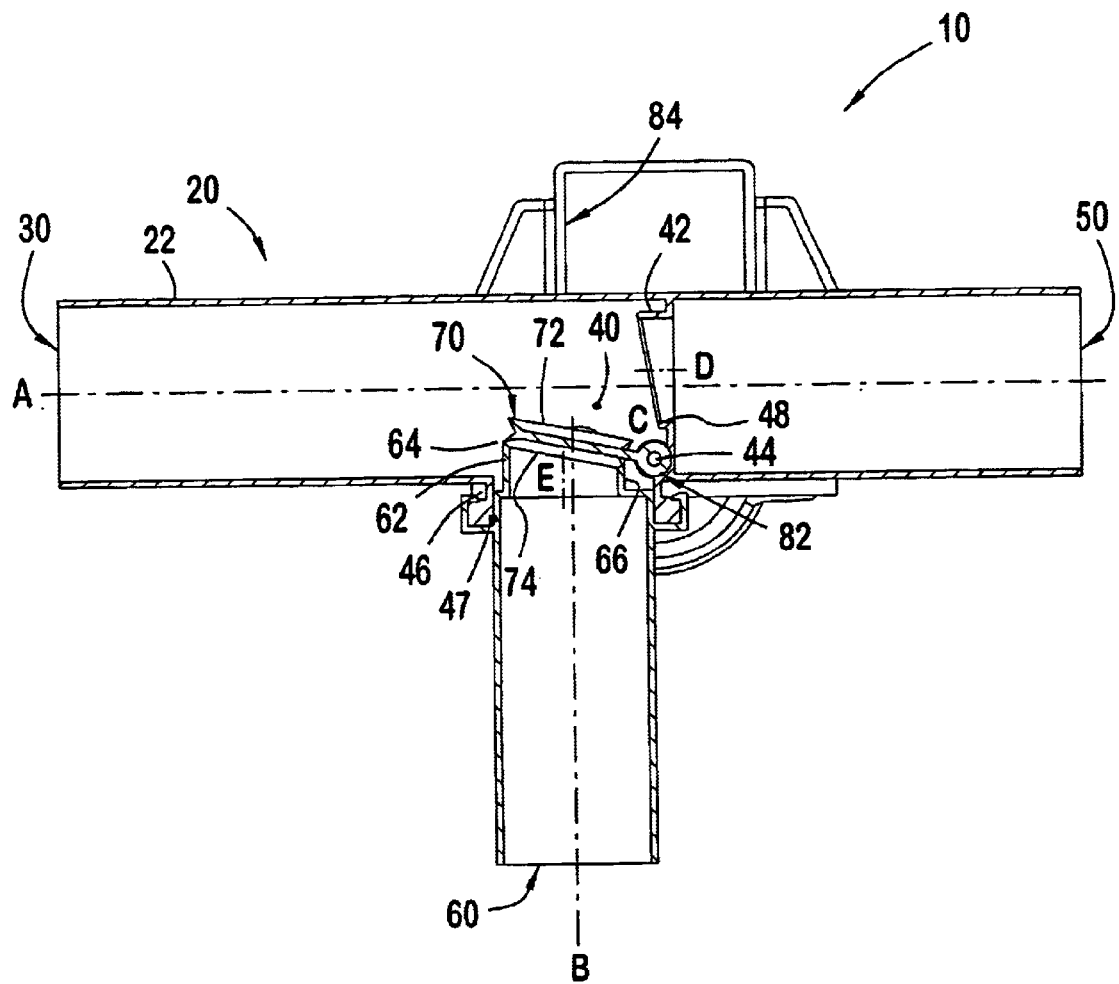
FIG. 1 illustrates a cross-sectional view of a bypass control valve according to a preferred embodiment of the invention.

FIG. 1 illustrates a bypass control valve 10 for a fuel cell according to a preferred embodiment. The bypass control valve 10 includes a first passage 20 defined by a wall 22 and disposed along a first axis A. The first passage 20 has a first portion 30, a second portion 50, and a transitional portion 40 disposed between the first portion 30 and the second portion 50. The transitional portion 40 has a first port 42, a pivot point 44, and an annular locking member 46. The first port 42 is a generally cylindrically-shaped member, has a first diameter, and is disposed along a fourth axis D, which is parallel to the first axis A. The first port 42 has a first sealing surface 48 disposed thereon. The first sealing surface 48 is a generally planar surface and can be disposed transverse to the first axis A. Preferably, the first sealing surface 48 is oblique to the first axis A. The annular locking member 46 is proximate the transitional portion 40. The annular locking member 46 also includes an annular seal 47.

The bypass control valve 10 also includes a bypass passage 60 disposed along a second axis B, which is oblique to the first axis A. The bypass passage 60 has a second port 62 which projects into the transitional portion 40. The second port 62 is a generally cylindrically-shaped member, has a second diameter, and is disposed along a fifth axis E, which is parallel to the second axis B. The second diameter of the second port 62 can be different than the first diameter of the first port 42. It is believed that the diameters of the first port 42 and the second port 62 dictate the amount of pressure drop of downstream flow. Preferably, the diameter of the second port 62 is generally the same or less than the first diameter of the first port 42. The second port 62 has a second sealing surface 64 and a receiver portion 66 coupled to the annular locking member 46. The second sealing surface 64 is a generally planar surface which can be disposed transverse to the second axis B. Preferably, the second sealing surface 64 is oblique to the second axis B.

The bypass port 62, including bypass passage 60, can be detached from the annular locking member 46 such that a different sized bypass port 62 and/or a different sized bypass passage 60 can be coupled to the first passage 20. Preferably, the bypass port 62 and the passage 60 can be detached from the first passage 20 so as to facilitate maintenance of the first passage 20, including associated seals and a closure member 70.

The closure member 70 includes elastomeric members disposed on a first planar surface 72, contiguous to the first port 42, and a second planar surface 74, contiguous to the second port 62. The closure member 70 can be a generally cylindrically shaped member. The closure member 70 is pivotally attached to the pivot point 44 and movable between a first position with the first planar surface 72 forming a seal with the first surface 48 of the first port 42 to prevent fluid flow from the second portion 50 to the first portion and vice versa. The closure member 70 can also be moved to a second position with the second planar surface 74 to form a seal with the second sealing surface 64 of the second port 62. The closure member 70 in the first position permits fluid communication between the first portion 30 and the bypass passage 60 and prevents fluid communication between the first portion 30 and the second portion 50. The closure member 70 in the second position permits fluid communication between the first portion 30 and the second portion 50 and prevents fluid communication between the first portion 30 and the bypass passage 60.

Figure 2A:
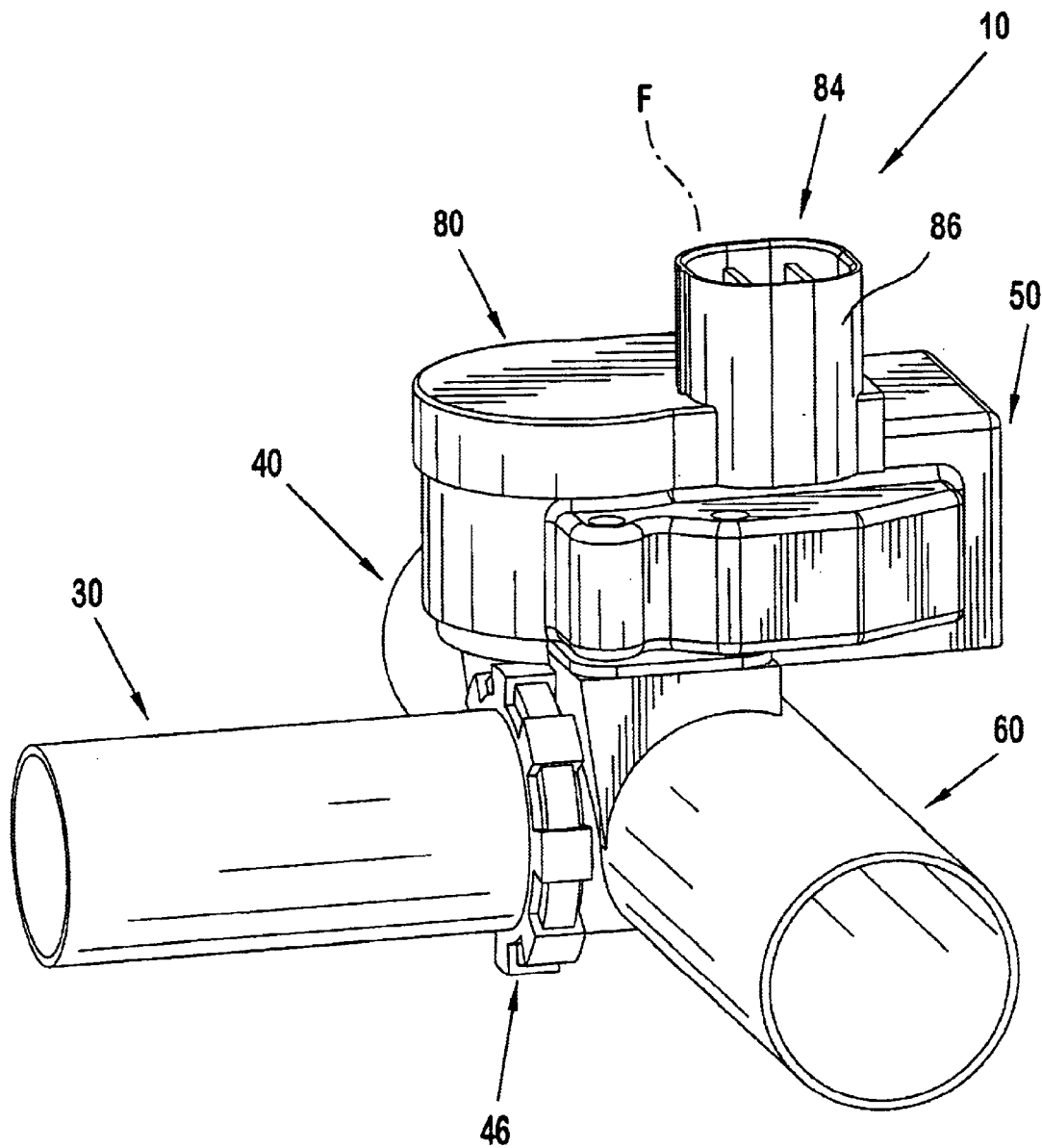
FIGS. 2A and 2B illustrate orthogonal views of the bypass control valve of FIG. 1.
Figure 2B:
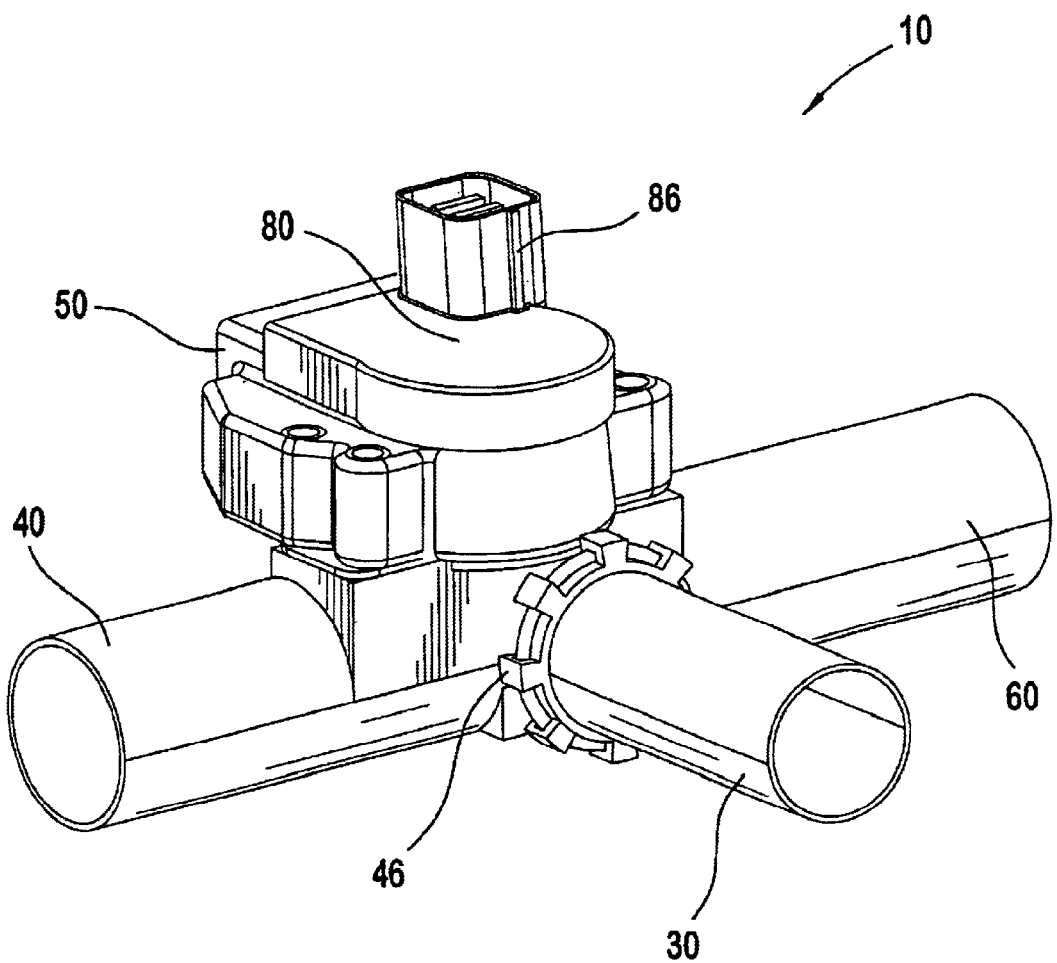

The bypass control valve 10 also includes an actuator 80 (FIGS. 2A and 2B), which is operable to rotate the closure member 70 between the first position and the second position. The actuator 80 has a shaft 82 that extends through the wall 22 to the pivot point 44 along a third axis C, which is orthogonal to the first axis A and the second axis B. The shaft 82 is coupled to the closure member 70 to rotate the closure member 70 about the pivot point 44. The actuator 80 can be powered by a pneumatic, hydraulic or electric primary drive source. Preferably, an electric motor 100 (FIG. 3), is used to rotate the closure member 70 to a plurality of positions, including the first and second positions. The electric motor is enclosed in a housing 84, which is disposed on an exterior surface of the wall 22. The electric motor may be a stepper motor and is electrically connected to a position sensor (not shown) disposed proximate the shaft 82. The torque of the electric motor may be increased or decreased by a gearing arrangement (not shown) disposed between the electric motor and the shaft 82. The housing 84 can be made of metallic or polymeric material and is disposed along a sixth axis F, which is parallel to the third axis C.

The housing 84 can include an electrical connector 86 disposed on the exterior surface of the housing 84, and electrically connected to the electric stepper motor. The electric motor 100 can include a position sensor disposed in an interior surface 104 (FIG. 3) of the housing 84 proximate the rotor 110. The position sensor can comprise a stator sensor 116 fixed to the housing 84 and a rotor sensor 118 coupled to the rotor 110.

Figure 3:
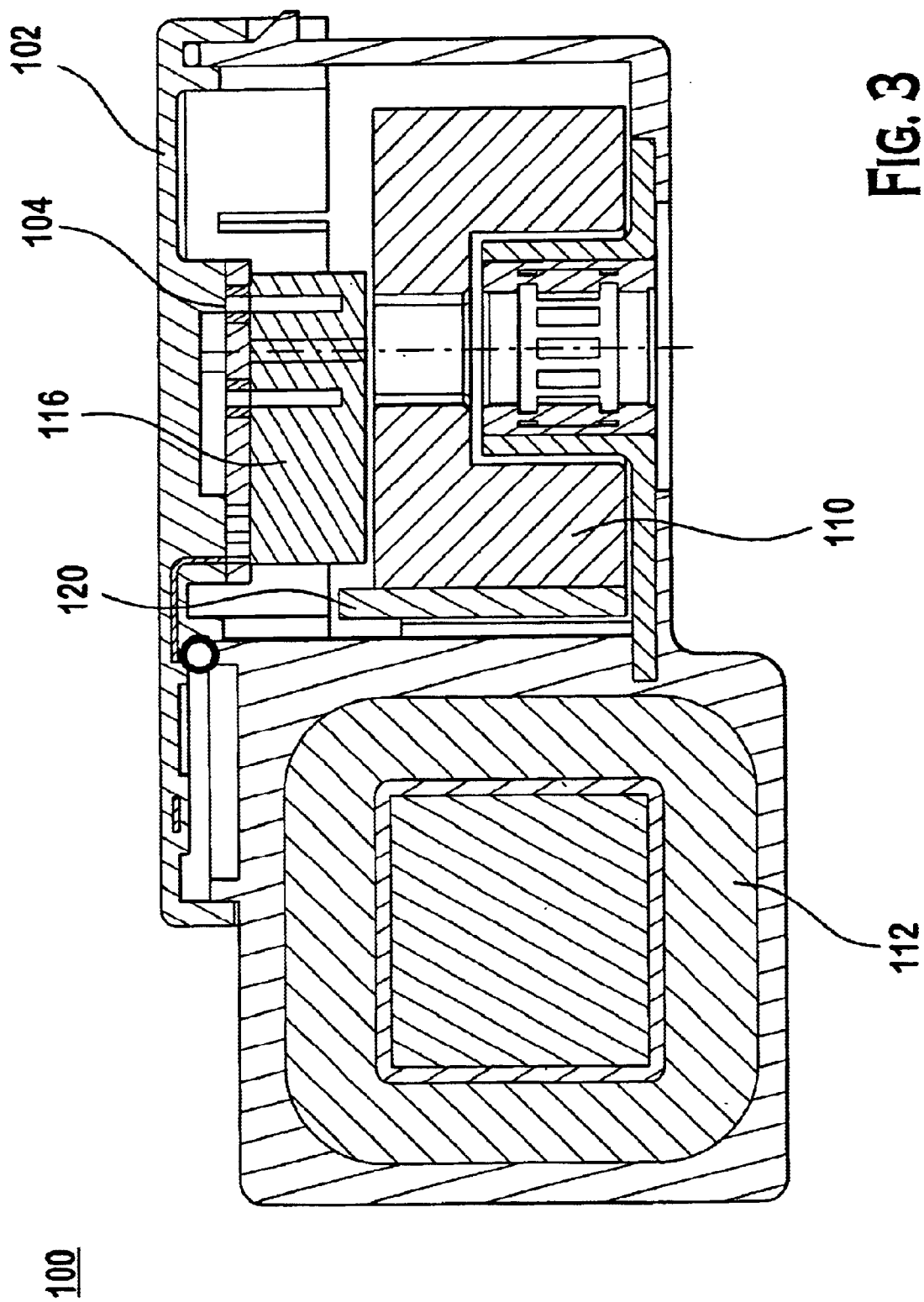
FIG. 3 illustrates a preferred embodiment of the electric motor usable with the bypass control valve of FIGS. 1, 2A, and 2B.

A coil and bobbin assembly 112 of the electric motor can be disposed in the interior surface 104 of the housing 84 at an offset position relative to the axis F. The electric motor 100 can also have a sensor disposed in the electric motor housing 102, the sensor including a rotor sensor 110 coupled to the driveshaft 108 and a stator sensor 116 disposed proximate the rotor sensor 110. The rotor 110 can be a generally cylindrical magnetic rotor. As illustrated in FIG. 3, the generally cylindrical magnetic rotor can have a magnet portion 120 extending from the generally cylindrical magnetic rotor along the axis F such that the magnet portion 120 projects beyond a planar surface defined by a base of the generally cylindrical magnetic rotor 110. The coil/bobbin assembly 112 can include a stator sensor 116, preferably a Hall effect sensor, coupled to the electric motor housing 102, such that when the magnetic portion 120 rotates about the stator sensor 116, a position of the magnetic portion 120 can be detected by the stator sensor 116.

The operation of the bypass control valve 10 will now be described. When an engine (not shown) is started, the closure member 70 is in the first position, air or a mixture of air and hydrogen is permitted to flow between the first portion 30 and the bypass passage 60. In the first position, the closure member 70 provides a fluid-tight seal between the first portion 30 and the second portion 50, thus preventing flow to the second portion 50. Upon receipt of an appropriate signal, the electric motor (not shown) operates the actuator 80, which rotates the closure member 70 from the first position to the second position. When the closure member 70 is in the second position, air or the air/hydrogen mixture is permitted to flow between the first portion 30 and the second portion 50. The air or air/hydrogen mixture exits the second portion 50 and flows to a fuel cell stack (not shown). In the second position, the closure member 70 provides a fluid-tight seal between the first portion 30 and the bypass passage 60, thus preventing air flow to the bypass passage 60.

Although the preferred embodiments have been described as being associated with the flow of air in a fuel cell, it is contemplated fluids or a combination of air and fluid can also be used in the bypass control valve 10 in other applications requiring bypass flow control, such as, for example, heating and air conditioning air delivery systems or a precision fluid delivery system.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What is claimed is:

1. A bypass control valve for a fuel cell, the control valve comprising:
   a wall defining a first passage disposed along a first axis and having a generally uniform cross-section orthogonal to the first axis, the first passage having a first portion, a second portion and a transitional portion disposed between the first and second portion, the cross-section in the transitional portion being at least partially occluded by a first port, a pivot point in the first passage, and an annular locking member proximate the transitional portion, the first port having a first sealing surface disposed thereon;
   a first bypass passage disposed along a second axis non-parallel to the first axis, the first bypass passage having a second port, the second port having a second sealing surface and a receiver portion, the second port projecting into the first passage and partially occluding the cross-section in the transitional portion, the receiver portion being coupled to the locking member;
   a closure member having a first planar surface and a second planar surface, at least one elastomeric member disposed on each of the first planar surface and second planar surface, the closure member being coupled to the pivot point and movable between a first position with the first planar surface contiguous to the first port to permit fluid communication between the first portion and the first bypass passage and to prevent fluid communication between the first portion and the second portion, the closure member movable to a second position with the second planar surface contiguous to the second port to permit fluid communication between the first portion and the second portion and to prevent fluid communication between the first portion and the first bypass passage; and an actuator operable to rotate the closure member between the first position and the second position, the actuator having a shaft extending through the wall to the pivot point along a third axis orthogonal to the first and second axis, the shaft being coupled to the closure member.

2. The bypass control valve of claim 1, wherein the actuator comprises an electric motor.

3. The bypass control valve of claim 2, wherein a torque of the electric motor is increased by a reduction gearing disposed between the electric motor and the shaft.

4. A bypass control valve for a fuel cell, the control valve comprising:

a wall defining a first passage disposed along a first axis and having a generally uniform cross-section orthogonal to the first axis, the first passage having a first portion, a second portion and a transitional portion disposed between the first and second portion, the cross-section in the transitional portion being at least partially occluded by a first port, a pivot point and an annular locking member proximate the transitional portion, the first port having a first sealing surface disposed thereon, the first sealing surface includes a generally planar sealing surface oblique to the first axis;

a first bypass passage disposed along a second axis non-parallel to the first axis, the first bypass passage having a second port, the second port having a second sealing surface and a receiver portion, the second port projecting into and partially occluding the cross-section in the transitional portion, the receiver portion being coupled to the locking member;

a closure member having a first planar surface and a second planar surface, at least one elastomeric member disposed on each of the first planar surface and second planar surface, the closure member being coupled to the pivot point and movable between a first position with the first planar surface contiguous to the first port to permit fluid communication between the first portion and the first bypass passage and to prevent fluid communication between the first portion and the second portion, the closure member movable to a second position with the second planar surface contiguous to the second port to permit fluid communication between the first portion and the second portion and to prevent fluid communication between the first portion and the first bypass passage; and an actuator operable to rotate the closure member between the first position and the second position, the actuator having a shaft extending through the wall to the pivot point along a third axis orthogonal to the first and second axis, the shaft being coupled to the closure member.

5. The bypass control valve of claim 4, wherein the second sealing surface comprises a generally planar sealing surface oblique to the second axis.

6. A bypass control valve for a fuel cell, the control valve comprising:

a wall defining a first passage disposed along a first axis and having a generally uniform cross-section orthogonal to the first axis, the first passage having a first portion, a second portion and a transitional portion disposed between the first and second portion, the cross-section in the transitional portion being at least partially occluded by a first port, a pivot point and an annular locking member proximate the transitional portion, the first port having a first sealing surface disposed thereon and a generally cylindrical portion centered around a fourth axis parallel to and spaced from the first axis;

a first bypass passage disposed along a second axis non-parallel to the first axis, the first bypass passage having a second port, the second port having a second sealing surface and a receiver portion, the second port projecting into and partially occluding the cross-section in the transitional portion, the receiver portion being coupled to the locking member;

a closure member having a first planar surface and a second planar surface, at least one elastomeric member disposed on each of the first planar surface and second planar surface, the closure member being coupled to the pivot point and movable between a first position with the first planar surface contiguous to the first port to permit fluid communication between the first portion and the first bypass passage and to prevent fluid communication between the first portion and the second portion, the closure member movable to a second position with the second planar surface contiguous to the second port to permit fluid communication between the first portion and the second portion and to prevent fluid communication between the first portion and the first bypass passage; and an actuator operable to rotate the closure member between the first position and the second position, the actuator having a shaft extending through the wall to the pivot point along a third axis orthogonal to the first and second axis, the shaft being coupled to the closure member.

7. The bypass control valve of claim 6, wherein the second port comprises a generally cylindrical portion centered around a fifth axis parallel to and spaced from the second axis.

8. The bypass control valve of claim 1, wherein the first sealing surface comprises a generally planar sealing surface transverse to the first axis.

9. The bypass control valve of claim 1, wherein the second sealing surface comprises a generally planar sealing surface transverse to the second axis.

10. The bypass control valve of claim 1, wherein the annular locking member further comprise an annular seal disposed in an annular groove of the locking member.

11. The bypass control valve of claim 1, wherein the first passage comprises a first port having a first diameter and the first bypass passage comprises a second port having a second diameter less than the first diameter.

12. The bypass control valve of claim 1, wherein the first passage comprises a first port having a first diameter and the first bypass passage comprises a second port having a second diameter substantially equal to the first diameter.

13. The bypass control valve of claim 2, wherein the electric motor comprises a stepper motor electrically connected to a position sensor disposed proximate the shaft.

14. The bypass control valve of claim 2, wherein the electric motor further comprises a housing enclosing the electric motor and disposed on an exterior surface of the wall.

15. The bypass control valve of claim 14, wherein the housing comprises a polymeric housing disposed along a sixth axis parallel to the third axis.

16. The bypass control valve of claim 1, wherein the first bypass passage is substituted with a second bypass passage.

17. A method of controlling bypass flow of air in a first passage to a second passage oblique to the first passage, the first passage having a generally uniform cross-section orthogonal to a first axis and having a boss portion, at least one port at least partially occluding the cross-section in the first passage and a bypass port for the second passage at least partially occluding the cross-section, the method comprising:

provinding a first flow path through a first portion, a transition portion and a second portion of the first passage, and providing a second flow path through the first portion and the bypass port, the bypass port of the second passage extending into the first passage proximate the transition portion;

positioning in the transition portion a closure member that provides a fluid-tight seal between the first passage and the bypass port to occlude flow through the second passage, thereby allowing flow through the first flow path; and positioning in the transition portion the closure member to provide a fluid-tight seal between the first portion and the second portion to occlude flow through the second portion, thereby allowing flow through the second flow path.

18. The method of claim 17, wherein the positioning further comprises rotating the closure member about an axis of the boss portion.

19. The method of claim 17, wherein the providing further comprises fixedly coupling the bypass port to a lock portion of the first passage with a receiver portion of the bypass port, and the bypass port being coupled to the second passage extending therefrom.

20. The method of claim 19, wherein the providing further comprises detaching the bypass port from the lock portion of the first passage and fixedly coupling an alternate bypass port to the lock portion of the first passage with a receiver portion of the alternate bypass port, the alternate bypass port having an alternate second passage extending therefrom.

* * * * *